United States Patent [19]
Hutzell

[11] 3,820,195
[45] June 28, 1974

[54] MEAT-HANGING APPARATUS AND THE LIKE
[76] Inventor: Robert D. Hutzell, 1430 S.W. 345th Ave., Hillsboro, Oreg. 97123
[22] Filed: Dec. 13, 1972
[21] Appl. No.: 314,818

[52] U.S. Cl. ............... 17/44.2, 294/85, 24/230.5 R, 248/339
[51] Int. Cl. ............................................ A22b 1/00
[58] Field of Search ................ 294/82, 85; 17/44.2; 24/230.5 R; 248/339–341

[56] References Cited
UNITED STATES PATENTS
2,803,037  8/1957  Graber................................. 17/44.2
2,943,581  7/1960  Bendik............................ 17/44.2 X FOREIGN PATENTS OR APPLICATIONS
638,435  3/1964  Belgium............................. 17/44.2

Primary Examiner—Albert J. Makay
Assistant Examiner—R. Johnson
Attorney, Agent, or Firm—John J. Leavitt

[57] ABSTRACT

Presented is a meat hook and meat-hanging apparatus which are either covered with a layer of tough resilient nonmetallic material, or which are fabricated entirely from such tough resilient nonmetallic material.

3 Claims, 4 Drawing Figures

MEAT-HANGING APPARATUS AND THE LIKE

BACKGROUND OF THE INVENTION

In the meat industry, it is conventional practice to transport and store the carcasses of butchered animals by means of suspending such carcasses or portions thereof from metallic meat hooks one end of which penetrates through a portion of the meat and the other end of which hooks over a suspension rail or track. Such suspension rails or tracks may be mounted in a refrigerated truck or railroad boxcar, both of which vehicles are commonly used for transporting meat to point of sale or distribution. Metallic meat hooks and meat suspension apparatus such as suspension racks, rails and tracks are also commonly used in slaughterhouses during butchering and trimming to support carcasses.

Supporting racks, rails and tracks, and the meat hooks which are conventionally used with them to support carcasses have heretfore been fabricated from galvanized metal or, infrequently, stainless steel. It has been found that frequent and continual sliding motion of the meat hooks in relation to the supporting racks, rails and tracks causes metal dust, metal slivers and flakes of galvanizing metal to contaminate the meat suspended by such equipment. Such contaminants originate from the meat hook in some cases, and in other cases from the supporting racks, rails and tracks. This problem is so prevalent in the meat industry and has existed for so long that many different methods have been used, largely unsuccessfully, in an attempt to solve the problem.

For instance, the parts in question are sometimes coated with oil or grease. Such coatings have the disadvantage of becoming rancid and themselves contaminating the meat, and they are not entirely effective. Others have recognized this problem as exemplified by the teaching of U.S. Pat. No. 3,229,821. The solution there taught involves restriction of relative movement between the meat hooks and the supporting rails. This expedient might minimize the problem but has not solved it because limiting the movement tends to increase the frequency of oscillation or relative movement, thus tending to aggravate the problem it is intended to solve. Accordingly, it is the principal object of this invention to provide a meat hook and supporting rack, rail and track structure and apparatus designed to eliminate this problem entirely.

The concept of a "captive" meat hook is also taught in U.S. Pat. No. 3,218,018 in which the hook guide portion is generally rectangular and adapted to snugly engage in sliding relation a complementarily shaped support rail. The complementary rectangular configuration is said to prevent rotary displacement of the meat hook about the guide rail by virtue of the sliding abutment of the side faces of the guide portion of the hook with the side faces of the rail. But such contact contributes to wear of hook and rail, and causes grooves or flutes on the sliding surfaces of the hook and rail. Accordingly, it is one of the objects of this invention to provide a hook and guide rail assembly in which the hook and guide rail have only a line contact in all positions of the hook on the rail, and in which the hook is permitted to rotate in relation to the rail, thus eliminating the possibility of formation of flutes and grooves in the hook or rail.

In the meat industry it has been found that stainless steel can be used to good advantage for meat hooks and related supporting racks, rails and tracks. The principal advantage is that equipment fabricated from stainless steel does not corrode and that it may be readily sterilized. Meat hooks and related equipment manufactured from stainless steel have the disadvantage of being expensive and the further disadvantage that its use does not solve the problem of metal contaminants falling on the meat. Accordingly, it is a still further object of the invention to provide on metal meat hooks and related support racks, rails and tracks a tough resilient layer of a nonmetallic material such as an appropriate plastic which permits relative motion between the encased meat hook and the encased supporting apparatus and precludes a metal-to-metal contact and a metal-to-plastic contact therebetween, thus preventing the formation of metal dust, slivers or flakes.

Inasmuch as it is desirable to sterilize meat hooks and related support apparatus such as racks, rails and tracks, it is another object of the invention to provide such components or portions thereof, with layers of a tough resilient nonmetallic material which is impervious to the temperatures at which sterilizing is effected, and which themselves may be sterilized and caused to adhere even tighter to metallic portions they may envelope by the application of sterilizing heat.

It is a still further object of the invention to fabricate a meat hook entirely from such a tough resilient nonmetallic material, thus eliminating completely the possibility that the meat may be contaminated by metal dust, slivers and flakes, and eliminating also the possibility of corrosion of the metal core of a plastic encased hook, and concomitantly reducing the weight of the hook.

Another problem that is prevalent in the meat industry, and which is not commonly known, is that every year unknown numbers of meat hooks are lost in one way or another and must be replaced at great expense. It is customary for each meat processing plant to buy its own meat hooks, and sometimes the name of the meat processing plant is engraved or embossed on the meat hooks. Still, many of such hooks are lost each year through pilferage or otherwise. Accordingly, it is a still further object of the invention to provide a means by which metallic, plastic encased metallic and plastic meat hooks may be color coded by the application of multi-colored bands of a tough resilient nonmetallic material so that meat hooks may readily be identified and claimed by their owners.

The invention possesses other objects and features of advantage, some of which, with the foregoing, will be apparent from the following description and the drawings. It is to be understood however, that the invention is not limited to the embodiment illustrated and described, but may be embodied in different forms within the scope of the appended claims.

BRIEF SUMMARY OF DISCLOSURE

In terms of broad inclusion, the invention comprises the improvement of meat hooks per se or meat-handling equipment and apparatus such as meat racks, rails and tracks by enveloping such meat hooks and related apparatus and mechanisms in a tough resilient nonmetallic layer of material, preferably a heat-sensitive synthetic resinous material such as polyvinyl chloride which is dimensionally stable until it reaches a temperature of approximately 300° F, at which point is condenses and shrinks about the meat hook or other meat-handling apparatus so as to form a tight impervious tough resilient nonmetallic layer on the meat hook or apparatus which conforms closely to the configuration thereof. In another aspect of the invention, the meat hook is fabricated wholly from such synthetic resinous material.

DESCRIPTION OF THE PREFERRED EMBODIMENT

Figure 1:
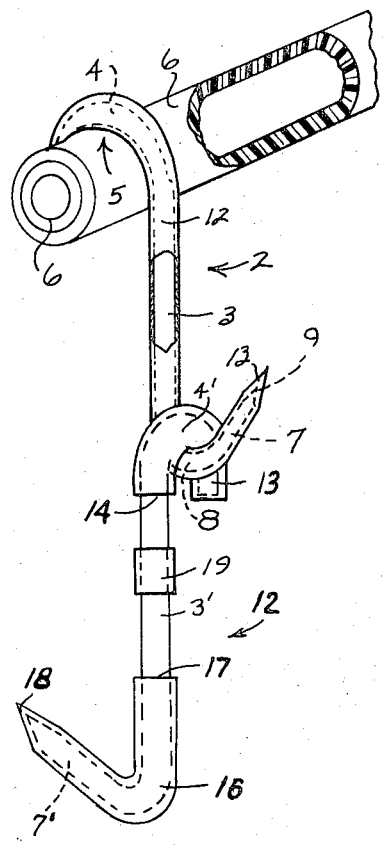
FIG. 1 is an enlarged fragmentary perspective view illustrating the cooperative relationship between a plastic meat hook and a plastic supporting rail in accordance with this invention; and the relationship between two meat hooks in accordance with this invention, one of which is wholly plastic and has suspended from it the other which is partially encased in plastic and is color-coded.

In terms of greater detail, the meat hook forming the invention in one of its aspects is illustrated in FIG. 1 and is designated generally by the numeral 2. The meat hook in one embodiment includes an elongated intermediate connecting portion or shank 3, integrally connected with and merging smoothly with a generally circular return bend portion 4, forming a hook or bight 5, within which may be caught a cylindrical support rail or track 6. At its other end, the meat hook is provided with a meat-engaging end 7 connected to the shank 3 by a return bend 8 and terminating at its end remote from the return bend 8 in a relatively sharp point 9.

Meat hooks may be formed of any selected length, usually varying from approximately 6 inches in length to several feet. Conventional meat hooks are customarily fabricated from metallic rod having a diameter ranging from ⅜ inch to ⅝ inch. The diameter of the circular bight 5 between the return bend portion and shank 3 is conveniently approximately 2 inches, while the length of the meat-engaging hook portion 7 between the return bend portion 8 and the point 9 is approximately four inches in length. These dimensions may hold true without regard to the overall length of the meat hook, and of course may be varied to suit a particular application.

As shown in FIG. 1, the meat hook 2 is completely formed from a tough resilient synthetic resinous material such as polyvinyl chloride.

A second embodiment of the meat hook of the invention is illustrated in FIG. 1, designated generally by the numeral 12. In this embodiment the return bend portion 4' of a metallic hook is enveloped with a layer 13 of a tough resilient nonmetallic material, and the layer of nonmetallic material is terminated at 14 where the shank 3' merges with the return bend portion 4'. Another distinction of this embodiment is that the meat-engaging end portion 7' is completely enveloped with a layer of tough resilient nonmetallic material 16, but the layer of material terminates at 17, coinciding with the point where the shank 3' merges with the meat-engaging portion 7'. The central shank portion of the metal meat hook is thus left uncovered, to be used in a manner which will hereinafter be described.

The enveloping layer cut to proper length, is preferably slipped over the metallic hook, and subjected to heat to a temperature sufficient to effect shrinkage of the polyvinyl tube closely about the meat hook. It has been found that a temperature somewhat over 300° F for a period of about 5 minutes is sufficient to effect adequate shrinkage of the polyvinyl chloride layer. While still subject to the effects of heat, the end of the polyvinyl chloride tube associated with the pointed end 18 of the meat hook is manually formed to conform to the configuration of the point of the meat hook and the end of the polyvinyl tube is sealed by fusing the walls of the tube together as shown.

Because of the prevalence of pilferage of meat hooks, it is desirable to designate the ownership of hooks by either stamping the owner's name thereon or in some other manner signifying ownership. In the second embodiment illustrated in FIG. 1 designated by the numeral 12, the shank 3' is provided with a distinctively colored band 19 of a polyvinyl chloride that is shrunk onto the shank and which designates ownership of the hook either through its color alone, or by appropriate indicia embossed thereon. If desired, a number of such bands of different colors may be utilized.

Figure 2:
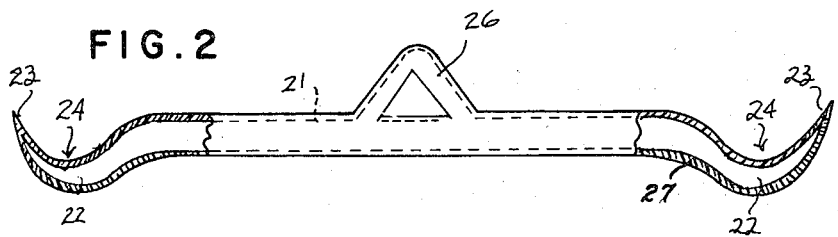
FIG. 2 is an elevational view partly in section of a gambrel type suspensor utilized for hanging carcasses for various purposes.

FIG. 2 illustrates a gambrel device utilized to suspend carcasses during the butchering process. The gambrel is provided with a central body portion 21 formed at each end with a shallow hook 22 terminating in a point 23. Between the point 23 and the body portion 21 is a shallow depression 24 from which point a carcass is suspended in spread-eagled fashion. A triangular loop 26 formed integrally with the central body portion of the gambrel projects therefrom to form a convenient means by which the gambrel may be hung on a supporting hook or rail. In accordance with this invention, the entire gambrel structure including the central main body portion and the laterally projecting hook portions 22 are completely enveloped in a tough resilient layer 27 of polyvinyl chloride or other appropriate nonmetallic plastic material.

Figure 3:
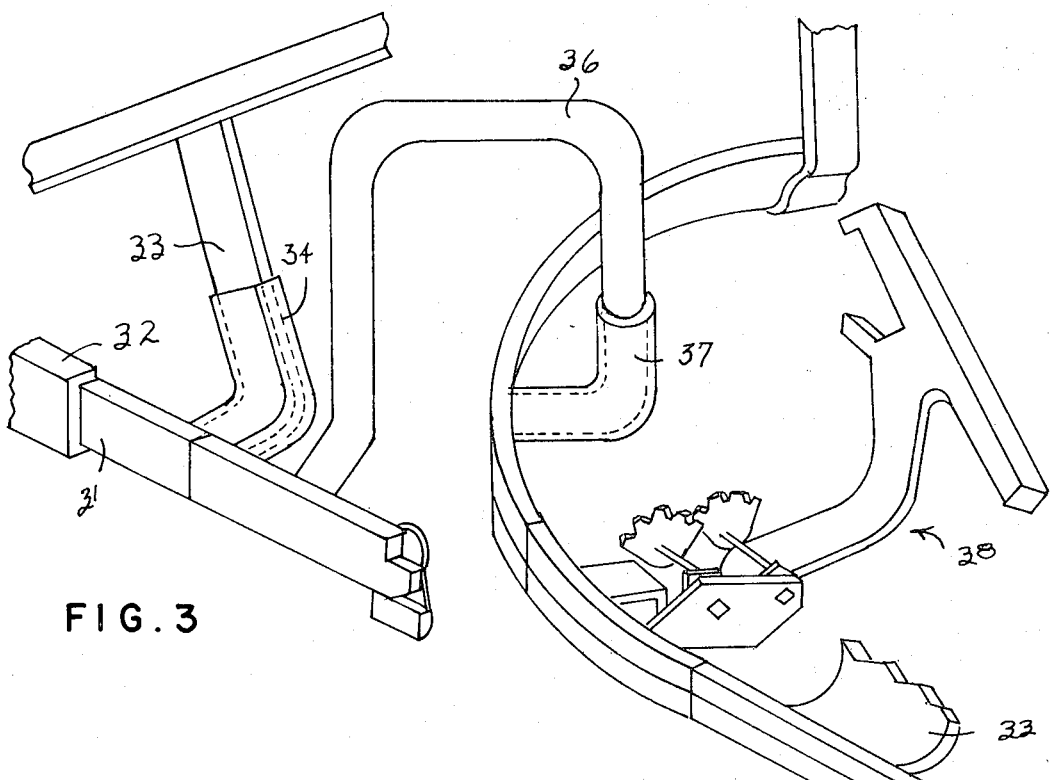
FIG. 3 is a fragmentary perspective illustrating an overhead track and rail assembly for supporting meat hooks and suspended carcasses and for transporting such carcasses from one area to another.
Figure 4:
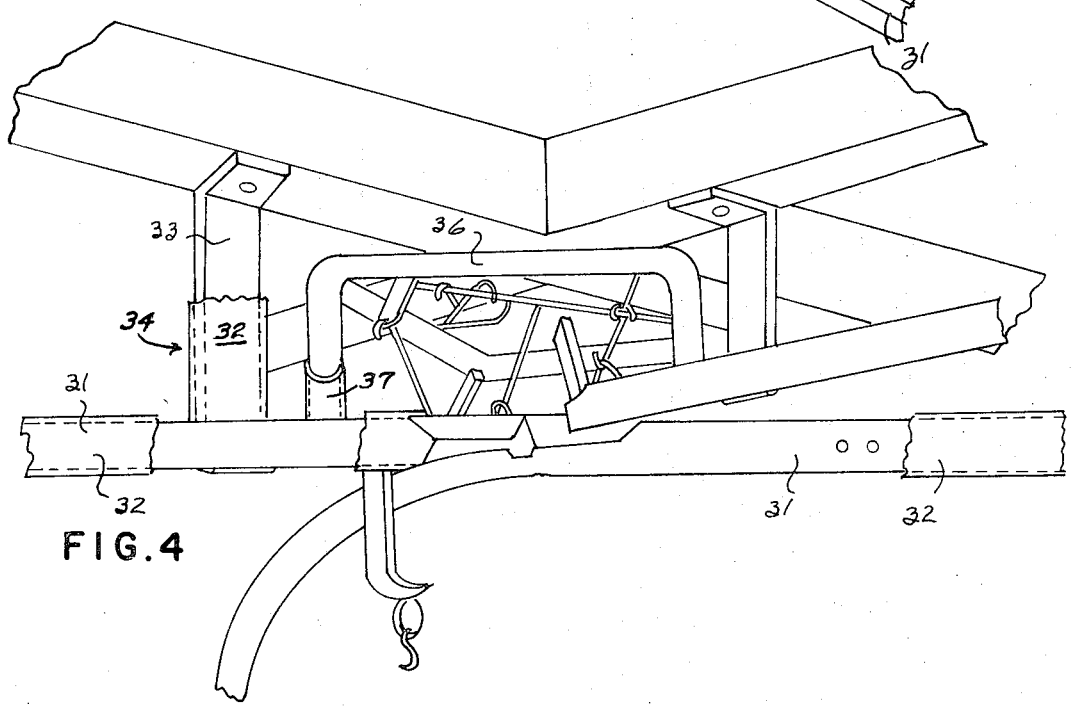
FIG. 4 is another embodiment of a meat-supporting overhead rail assembly, including a gate mechanism for shunting suspended carcasses in various directions from one area to another.

FIGS. 3 and 4 illustrate two different types of overhead racks, rails and tracks for the storage and transport of meat from one area to another. Referring specifically to FIG. 3, meat hooks such as those disclosed in FIG. 1 are conveniently hooked over the supporting rails 31 which are preferably coated with a layer 32 of a tough resilient nonmetallic plastic material of the same type that is used to envelope the hooks. This gives a plastic-to-plastic contact which completely eliminates contamination and reduces friction to a negligible amount.

The rails are conveniently supported from upwardly extending brackets 33 which are also preferably coated with a layer 34 of a tough resilient nonmetallic material. In this illustration, for clarity, only a portion of the bracket 33 is shown coated with such a layer of material. In like manner, other bracket configurations, such as the inverted generally U-shaped bracket 36, are preferably coated with a layer 37 of a tough resilient nonmetallic material.

To shunt carcasses from one area to another, overhead rails and tracks are provided with gate mechanisms such as that illustrated in FIG. 3 at 38. For cleanliness in the handling of meat, and to prevent contaminants from falling on the meat, all such gate mechanisms are preferably coated with a layer (not shown) of tough resilient nonmetallic material of the same type that is utilized to coat the meat hooks.

FIG. 4 illustrates a slightly different embodiment of an overhead track system selected portions of which, or the mechanism in its entirety, are coated with a layer 32 of tough resilient nonmetallic material such as polyvinyl chloride. Elements of FIG. 4 which correspond to elements illustrated in FIG. 3 have been correspondingly numbered.

It has been found that to facilitate application of the polyvinyl chloride layer to complex configurations such as those illustrated in FIGS. 3 and 4, the most expedient manner is to dip the entire mechanism in a vat of the coating material and permit the material to cure after it is withdrawn from the vat. Another method of application is to apply appropriately dimensioned polyvinyl chloride tubing to specific configurations prior to assembly, with assembly then proceeding in the usual manner. The difficulty with this method of application is that frequently, complex configurations such as those illustrated in FIGS. 3 and 4, are welded rather than bolted, thus raising the possibility that the previously applied layer of polyvinyl chloride will be ruptured or damaged during assembly. Another method of application of such tough resilient nonmetallic coatings to complex configurations such as those illustrated in FIGS. 3 and 4 is to spray the material onto the mechanism. The disadvantage of this method is that it is wasteful of the relatively expensive nonmetallic layer material and tends to limit the thickness of the layer that may be applied.

While these two latter methods of application may be disadvantageous in some respects, it will of course be apparent that in certain applications they will be of particular usefulness. Because of the advantages noted above, the preferred method of application of the tough resilient nonmetallic material is to dip the equipment.

Having thus described our invention, what is claimed to be novel and sought to be protected by letters patent is as follows:

I claim:

1. In a metallic meat hook of the type adapted for suspension of meat from a support structure and including a meat-engaging end and a support structure-engaging end enjoined by a shank portion, the improvement comprising:
   a. a layer of tough resilient nonmetallic material applied to the support structure-engaging end of the meat hook to cover at least an area thereof normally expected to impinge on said support structure; and
   b. a layer of tough resilient nonmetallic material applied to the meat-engaging end of the meat hook;

c. both said layers of tough resilient nonmetallic material terminating at a point coincident with the union of the shank with the associated end of the hook encased in said tough nonmetallic material.

2. The combination according to claim 1, in which a portion of said shank disassociated from said hook ends is encased in a layer of said tough nonmetallic material.

3. The combination according to claim 2, in which said layer of tough nonmetallic material enveloping a portion of said shank disassociated from said hook ends is of a color different from the tough nonmetallic layers which encase said hook ends.

* * * * *